US008345954B2

(12) United States Patent
Daxauer et al.

(10) Patent No.: US 8,345,954 B2
(45) Date of Patent: Jan. 1, 2013

(54) METHOD AND APPARATUS FOR THE THREE-DIMENSIONAL DIGITIZATION OF OBJECTS

(75) Inventors: Herbert Daxauer, Walchaee (AT); Thomas Mayer, Kolbermoor (DE); Marcus Steinbichler, Neubeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 1150 days.

(21) Appl. No.: 12/231,952

(22) Filed: Sep. 8, 2008

(65) Prior Publication Data

US 2009/0080766 A1 Mar. 26, 2009

(30) Foreign Application Priority Data

Sep. 10, 2007 (DE) .......................... 10 2007 042 963

(51) Int. Cl.
*G06K 9/00* (2006.01)
(52) U.S. Cl. ....................... 382/154; 382/128
(58) Field of Classification Search .................. None
See application file for complete search history.

(56) References Cited

U.S. PATENT DOCUMENTS

| | | | | |
|---|---|---|---|---|
| 5,745,126 A * | 4/1998 | Jain et al. | ...................... | 382/154 |
| 5,800,364 A * | 9/1998 | Glennie et al. | ................. | 600/592 |
| 5,852,672 A * | 12/1998 | Lu | .................................. | 382/154 |
| 5,862,252 A * | 1/1999 | Yamamoto et al. | ............ | 382/154 |
| 5,988,862 A * | 11/1999 | Kacyra et al. | ...................... | 703/6 |
| 5,995,650 A * | 11/1999 | Migdal et al. | .................. | 382/154 |
| 6,038,074 A * | 3/2000 | Kitaguchi et al. | ............. | 359/618 |
| 6,044,170 A * | 3/2000 | Migdal et al. | .................. | 382/154 |
| 6,097,394 A * | 8/2000 | Levoy et al. | ................... | 345/419 |
| 6,101,408 A * | 8/2000 | Craine et al. | .................. | 600/425 |
| 6,125,197 A * | 9/2000 | Mack et al. | ..................... | 382/154 |
| 6,137,902 A * | 10/2000 | Kinoshita et al. | ............. | 382/154 |
| 6,317,139 B1* | 11/2001 | Williams | ....................... | 345/634 |
| 6,415,051 B1* | 7/2002 | Callari et al. | .................. | 382/154 |
| 6,549,289 B1* | 4/2003 | Ellis | ............................... | 356/603 |
| 6,677,942 B1* | 1/2004 | Rushmeier et al. | ............ | 345/420 |
| 6,720,949 B1* | 4/2004 | Pryor et al. | ..................... | 345/158 |
| 6,754,370 B1* | 6/2004 | Hall-Holt et al. | ............. | 382/106 |
| 6,856,935 B1* | 2/2005 | Fehlis et al. | ................... | 702/152 |
| 6,858,826 B2* | 2/2005 | Mueller et al. | ............. | 250/208.1 |
| 6,974,373 B2* | 12/2005 | Kriesel | .......................... | 452/157 |
| 7,095,886 B2* | 8/2006 | Massen | .......................... | 382/154 |
| 7,146,036 B2* | 12/2006 | An Chang et al. | ............ | 382/154 |
| 7,259,870 B2* | 8/2007 | Arai et al. | ...................... | 356/601 |
| 7,348,974 B2* | 3/2008 | Smith et al. | .................... | 345/420 |
| 7,436,522 B2* | 10/2008 | Steinbichler et al. | .......... | 356/601 |
| 7,447,558 B2* | 11/2008 | Pratt | .............................. | 700/118 |
| 7,612,870 B2* | 11/2009 | Graff et al. | .................... | 356/3.13 |
| 7,860,301 B2* | 12/2010 | Se et al. | ......................... | 382/154 |
| 7,889,906 B2* | 2/2011 | Smith et al. | .................... | 382/132 |
| 7,912,673 B2* | 3/2011 | Hebert et al. | .................. | 702/153 |
| 7,962,200 B2* | 6/2011 | Ntziachristos et al. | ........ | 600/476 |
| 8,031,909 B2* | 10/2011 | Se et al. | ......................... | 382/106 |
| 8,031,933 B2* | 10/2011 | Se et al. | ......................... | 382/154 |

(Continued)

*Primary Examiner* — Manav Seth
(74) *Attorney, Agent, or Firm* — Dilworth & Barrese, LLP.

(57) ABSTRACT

This invention relates to a method and an apparatus for the three-dimensional digitization of objects with a 3D sensor, which comprises a projector and one or more cameras, in which a pattern is projected onto the object by means of the projector, and the pattern is detected with the one or more cameras. In accordance with the invention, the method and the apparatus are characterized in that at least three reference marks and/or a reference raster are projected onto the object with the 3D sensor and are detected with two or more external, calibrated digital cameras.

20 Claims, 2 Drawing Sheets

U.S. PATENT DOCUMENTS

| | | |
|---|---|---|
| 8,082,120 B2 * | 12/2011 | St-Pierre et al. ............ 702/85 |
| 2004/0128102 A1 * | 7/2004 | Petty et al. ............ 702/150 |
| 2005/0128196 A1 * | 6/2005 | Popescu et al. ............ 345/420 |
| 2008/0201101 A1 * | 8/2008 | Hebert et al. ............ 702/152 |
| 2009/0221874 A1 * | 9/2009 | Vinther et al. ............ 600/178 |
| 2010/0098328 A1 * | 4/2010 | Se et al. ............ 382/154 |
| 2012/0040755 A1 * | 2/2012 | Pryor ............ 463/32 |

\* cited by examiner

METHOD AND APPARATUS FOR THE THREE-DIMENSIONAL DIGITIZATION OF OBJECTS

BACKGROUND OF THE INVENTION

This invention relates to a method and an apparatus for the three-dimensional digitization of objects, wherein a pattern is projected onto the object by means of a projector, and the pattern is detected with one or more cameras. Projector and cameras usually are constructionally integrated in a so-called 3D sensor. In particular the digitization by means of white-light strip projection is already known. In this method, the projector projects a strip image onto the object to be digitized. The strip image then is detected by the one or more cameras. The local object data, i.e. the three-dimensional object geometry in the local coordinate system of the 3D sensor, can be determined therefrom. For a complete or large-surface digitization of an object, the 3D sensor regularly must be moved into different recording positions, and the local object data at the individual recording positions must be combined in a global coordinate system, so as to be able in particular to combine the measurement results at the individual recording positions to a total measurement result for the entire surface measured. This requires a precise detection of the individual recording positions in a global coordinate system.

In the white-light strip projection, the global detection of the individual recording positions usually is effected by photogrammetric measurement of reference marks, which are attached or adhered to the object to be digitized and are separately measured with a photogrammetry system. The photogrammetric measurement of the reference marks performed before measurement with the 3D sensor provides a set of reference points, by means of which the local measurements of the 3D sensor at the individual recording positions can be transformed into a uniform, global coordinate system.

Although the photogrammetric measurement of the reference marks provides a high accuracy, it is disadvantageous because of the effort involved in preparing the object with the marks and because of the separate measurement operation. Alternatively, projected reference marks are used, which are projected onto the object to be digitized by means of an external separate projector. However, this involves the disadvantage of a reduced accuracy as compared to adhered marks, since the shape of the projected marks is influenced by the geometry of the object.

SUMMARY OF THE INVENTION

Against this background, it is the object of the present invention to propose an improved method and an improved apparatus for the three-dimensional digitization of objects. In particular, the method and the apparatus of the invention should provide for a comparatively high measurement accuracy with comparatively little measurement effort.

In accordance with the invention, this object is solved by a method with the features herein. Preferred aspects can also be taken from the description herein.

In the method of the invention, the three-dimensional digitization of the objects is effected by means of a 3D sensor which comprises a projector and one or more cameras. By means of the projector, a pattern is projected onto the object to be digitized. This pattern is detected with the one or more cameras of the 3D sensor. The method of the invention is characterized in that the 3D sensor, preferably the projector of the 3D sensor, projects at least three reference marks and/or a reference raster onto the object to be digitized. These reference marks or the reference raster are detected with two or more external, calibrated digital cameras. The external, calibrated digital cameras are arranged outside the 3D sensor, i.e. in particular not integrated in the same or constructionally firmly connected with the same. Rather, the spatial location of the external cameras is independent of the spatial location of the 3D sensor. Furthermore, the external cameras are calibrated, i.e. the inner and outer orientation of these cameras is known. Accordingly, the spatial location of these cameras in the global coordinate system (outer orientation) and the imaging properties of the cameras (inner orientation) both are known. As a result, the three-dimensional position of the reference marks or of the reference raster in the global coordinate system can be determined by means of the external, calibrated digital cameras. The transformation from the local into the global coordinate system requires at least three reference points which are known in both coordinate systems. Therefore, at least three reference marks are necessary, which are measured with the external cameras and the cameras of the sensor. Alternatively, a reference raster can also be used, as such provides at least three reference points. Combinations of one or two reference marks with a reference raster or any other combination of reference mark(s) and/or reference raster(s), which provide at least three reference points, are also possible.

The method of the invention makes a separate preparation of the object to be digitized with photogrammetry marks superfluous. Rather, the reference marks or the reference raster are also projected by the 3D sensor, preferably the projector of the 3D sensor. In every recording position of the 3D sensor, the projected reference marks or the projected reference raster can be measured by the external cameras in their three-dimensional position in the global coordinate system and be used for transformation of the local object data from the individual measurements of the 3D sensor into a global coordinate system. Thus, the method of the invention offers the decisive advantage that a separate attachment of reference marks or a separate projection of reference marks with an external projector can be omitted.

In a preferred aspect of the method of the invention, the detection of the reference marks or of the reference raster is effected simultaneously with the external cameras. Measurement accuracy can be increased thereby, in particular when the object to be digitized is moving, for instance in the case of vibrations.

In another preferred aspect, the projection of the reference marks or of the reference raster is effected by means of an imaging element in the projector of the 3D sensor. Advantageously, a transparency, a digital projection element, a transmissive LCD display, a mirror array and/or an LCOS display is used as imaging element.

In accordance with another preferred aspect, it is provided to vary the projection of the reference marks or of the reference raster in terms of brightness and/or shape. Advantageously, this variation is performed such that the measurement accuracy is increased and/or optimized. The increase of the measurement accuracy is achieved in particular in that a more accurate detection of the position of the reference marks or of the reference raster by the external cameras and the camera(s) in the 3D sensor is made possible. The variation of the reference marks or of the reference raster in terms of shape can provide for instance circular marks, cross-shaped marks or differently extending raster lines.

In another preferred aspect, the reference marks or the reference raster are projected into regions as flat as possible of the object to be digitized. As a result, distortions of the projected reference marks or of the projected reference raster are reduced or avoided, so that the accuracy of their detection can be increased. Advantageously, the procedure is such that in a recording position of the 3D sensor, the local object data, i.e. the object geometry in the local coordinate system of the 3D sensor, are determined first. By means of these local object data, regions of the object to be digitized then are selected, which are as flat as possible and vertical to the optical axis of the projector. Then, the reference marks or the reference raster are projected into the selected object regions. Such preferred methods can be realized in particular with a digital projector in the 3D sensor, which projects both patterns and reference marks or reference rasters.

In another preferred aspect, the shape of the reference marks or of the reference pattern is corrected upon measuring the local object data such that their shape on the object corresponds to a desired shape as largely as possible. This aspect also provides for a higher measurement accuracy.

In another preferred aspect, the size of the projected reference marks or of the reference raster is adapted to the resolution of the external cameras and/or of the one or more cameras of the 3D sensor.

In another preferred aspect, the reference marks or the reference raster are modulated in terms of brightness in the time domain, and the reference marks or the reference raster are detected by means of an image sequence of the external cameras. As a result, the accuracy of the detection by the external cameras can be increased.

In another preferred aspect, the reference marks or the reference raster are provided with an identification code. Preferably, the identification code can be modulated on by spatial and/or time modulation of the brightness of the reference marks or of the reference raster. Another possibility is the time modulation of the shape of the reference marks or of the reference raster.

In accordance with the invention, the object furthermore is solved by an apparatus with the features herein. Preferred aspects of the apparatus can be taken from the description herein.

The apparatus in accordance with the invention comprises a 3D sensor with a projector for projecting a pattern and one or more camera(s), wherein the 3D sensor is in particular characterized in that at least three reference marks and/or a reference raster can be projected with the same onto the object to be digitized. The projector which projects the pattern preferably is configured such that it also projects the reference marks and/or the reference raster. Furthermore, the apparatus of the invention comprises two or more external, calibrated digital cameras which are configured such that the reference marks and/or the reference raster can be detected with the same.

BRIEF DESCRIPTION OF THE DRAWINGS

One embodiment of the invention will be explained in detail with reference to the Figures described below, in which.

DESCRIPTION OF THE PREFERRED EMBODIMENTS

Figure 1:
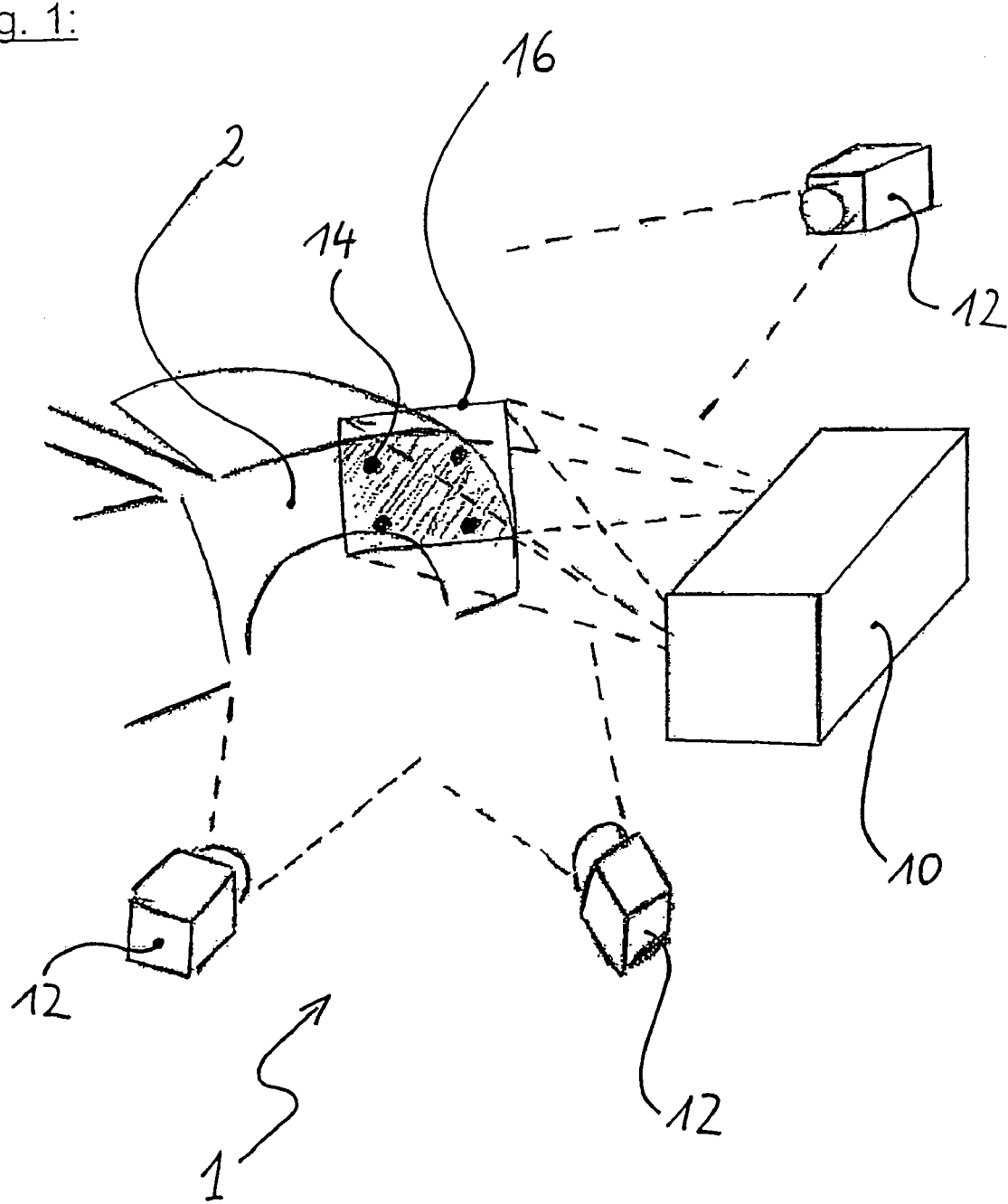
FIG. 1: shows an apparatus (1) of the invention with a 3D sensor (10) and external cameras (2)

FIG. 1 shows an apparatus 1 of the invention when performing the three-dimensional digitization or measurement of an object, namely a car fender 2. The apparatus of the invention comprises a 3D sensor 10, in which a pattern projector and two cameras are integrated. The pattern projector on the one hand projects a white-light strip pattern and on the other hand four reference marks 14 into the measurement region 16. With its two cameras, the 3D sensor 10 on the one hand detects the three-dimensional local object data in the measurement region 16, i.e. the three-dimensional geometry of the fender section 16, in the local coordinate system of the 3D sensor. Furthermore, the 3D sensor detects the three-dimensional position of the reference marks 14 in the local coordinate system of the 3D sensor. Furthermore, the apparatus 1 of the invention as shown in FIG. 1 comprises three external cameras 12. The spatial location of the external cameras 12 is independent of the spatial location of the 3D sensor 10. In particular, the spatial location of the external cameras 12 can be maintained when moving the 3D sensor 10 into a new recording position. The external cameras are calibrated, i.e. their inner and outer orientation is known. What is known in particular is the spatial location of the three external cameras in the global coordinate system and their imaging properties. The three external cameras detect the three-dimensional position of the reference marks in the global coordinate system. Hence, the determination of the three-dimensional coordinates of the reference marks is possible both in the global and in the local coordinate system of the 3D sensor. This provides for the transformation of the local object data measured in various recording positions into a global coordinate system and thus the combination of the individual measurements performed in various recording positions to obtain a total measurement result.

Figure 2:
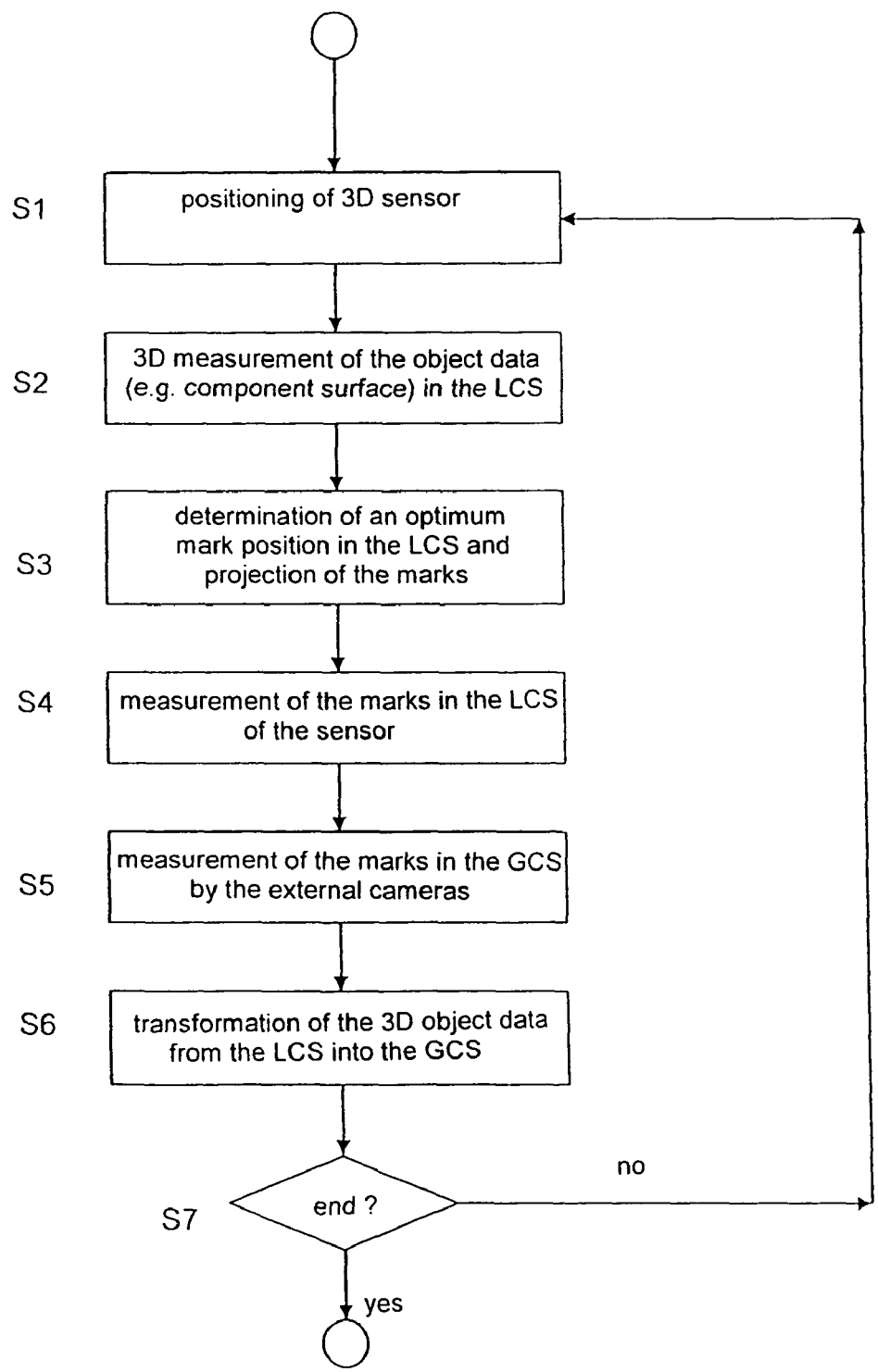
FIG. 2: shows the schematic course of one embodiment of the method in accordance with the invention.

FIG. 2 shows the schematic course of one embodiment of the method in accordance with the invention. In step S1, the 3D sensor is positioned in a certain recording position. In step S2, the three-dimensional object data in the local coordinate system (LCS) are measured in the measurement region 16 covered by the 3D sensor. For instance, a component surface located in the measurement region is subjected to a three-dimensional measurement in the local coordinate system. In step S3, optimum positions for the three reference marks in the local coordinate system are determined by means of the local object data determined in step S2. Furthermore, the reference marks are projected onto these optimum positions. In step S4, the three-dimensional position of the reference marks in the local coordinate system of the 3D sensor is measured. In step S5, the three-dimensional position of the reference marks in the global coordinate system (GCS) is mesured by the external cameras. In step S6, the local three-dimensional object data from the measurement in step S2 are transformed from the local coordinate system into the global coordinate system. In step S7, it is queried whether the entire measurement operation is terminated or whether a further measurement should be made in another recording position. If the answer in step S 7 is No, the 3D sensor is repositioned, and steps Si to S7 are performed again. If the answer in step S7 is Yes, the entire measurement operation is terminated.

With the invention, a multitude of advantages are achieved. In particular, a comparatively high measurement accuracy can be achieved with comparatively little effort.

The invention claimed is:

1. A method for the three-dimensional digitization of objects (2) with a 3D sensor (10), which comprises a projector and one or more cameras, in which a pattern is projected onto the object (2) by the projector and the pattern is detected with the one or more cameras, wherein with the 3D sensor (10) at least three reference marks (14) and/or a reference raster are projected onto the object (2), and the reference marks (14) or raster are detected with two or more external, calibrated digital cameras (12), wherein the 3D sensor is calibrated to a first coordinate system and the digital cameras are calibrated to a second coordinate system different from the first coordinate system.

2. The method according to claim 1, wherein the external, calibrated digital cameras simultaneously detect the reference marks or the reference raster.

3. The method according to claim 1, wherein the projection of the reference marks or raster is effected with an imaging element in the projector of the 3D sensor.

4. The method according to claim 1, wherein the measurement accuracy is optimized by varying the projection of the reference marks or raster in terms of brightness and/or shape.

5. The method according to claim 1, wherein the projection of the reference marks or the reference raster is effected in regions as flat as possible of the object to be digitized.

6. The method according to claim 5, comprising the following steps:
measuring local object data with the 3D sensor,
selecting object regions as flat as possible and vertical to the optical axis of the projector from the local object data, and
projecting the reference marks or the reference raster onto the selected object regions.

7. The method according to claim 1, wherein the shape of the reference marks or raster is corrected upon measuring the local object data such that the projected reference marks or raster on the object correspond to a desired shape as largely as possible.

8. The method according to claim 1, wherein the size of the projected reference marks or raster is adapted to the resolution of external cameras and/or the one or more camera of the 3D sensor.

9. The method according to claim 1, wherein the reference marks or raster are modulated in terms of brightness, and the detection of the reference marks or raster is effected by an image sequence of the external cameras.

10. The method according to claim 1, wherein the reference marks or raster are projected with an identification code, which preferably is modulated on by spatial and/or time modulation of the brightness and/or time modulation of the shape of the reference marks or raster.

11. An apparatus (1) for the three-dimensional digitization of objects (2) with a 3D sensor (10), which comprises a projector and one or more cameras, wherein a pattern can be projected onto the object (2) by the projector,
the pattern can be detected with the one or more cameras,
at least three reference marks (14) and/or a reference raster can be projected onto the object (2) with the 3D sensor (10), and
two or more external, calibrated digital cameras (12) are present, with which the reference marks or raster can be detected,
wherein the 3D sensor is calibrated to a first coordinate system and the cliental cameras are calibrated to a second coordinate system different from the first coordinate system.

12. The apparatus according to claim 11, wherein the projector of the 3D sensor comprises an imaging element for projection of the reference marks or raster.

13. The apparatus according to claim 11, wherein the 3D sensor is configured such that the brightness and/or color and/or shape of the projected reference marks or raster can be varied.

14. The apparatus according to claim 11, wherein the 3D sensor is configured such that the reference marks and/or raster can be projected with an identification code.

15. The apparatus according to claim 12, wherein the 3D sensor is configured such that the reference marks and/or raster can be projected with an identification code.

16. The apparatus according to claim 13, wherein the 3D sensor is configured such that the reference marks and/or raster can be projected with an identification code.

17. The apparatus according to claim 12, wherein the 3D sensor is configured such that the brightness and/or color and/or shape of the projected reference marks or of the projected reference raster can be varied.

18. The apparatus according to claim 17, wherein the 3D sensor is configured such that the reference marks and/or raster can be projected with an identification code.

19. The method according to claim 2, wherein the projection of the reference marks or raster is effected with an imaging element in the projector of the 3D sensor.

20. The method according to claim 19, wherein the measurement accuracy is optimized by varying the projection of the reference marks or raster in terms of brightness and/or shape.

* * * * *